May 9, 1950      E. R. WOODWARD      2,507,132
GAS GENERATOR
Filed April 10, 1945
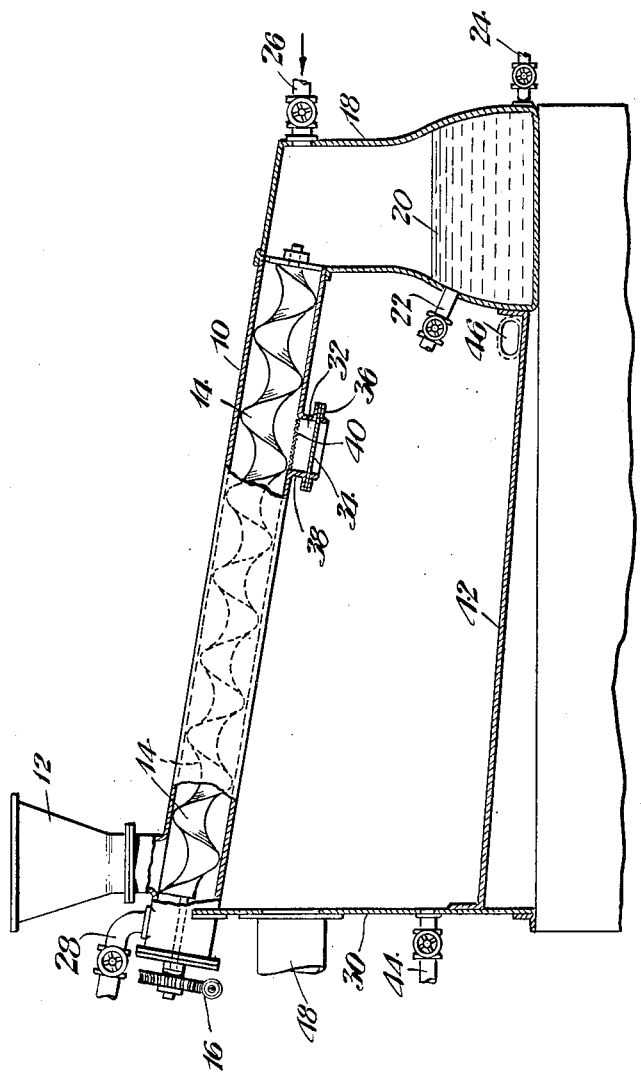
INVENTOR
*ERIC RAYMOND WOODWARD*
BY
Pennie, Davis, Marvin & Edmonds
ATTORNEYS Patented May 9, 1950

2,507,132

UNITED STATES PATENT OFFICE 2,507,132

GAS GENERATOR

Eric Raymond Woodward, New York, N. Y., assignor to Mathieson Chemical Corporation, a corporation of Virginia Application April 10, 1945, Serial No. 587,565

3 Claims. (Cl. 23—281)

This invention relates to the art of gas generation and is particularly directed to an improved apparatus for continuously generating a gas of an explosive nature.

The continuous gas generator of the present invention is applicable to the generation of any type of gas by the reaction between a solid reactant and a gaseous reactant. The improved apparatus is especially applicable to the generation of gases which tend to explode in certain concentrations and will be described in its application to the generation of chlorine dioxide by the reaction between gaseous chlorine and a solid chlorite.

In the generation of chlorine dioxide from a solid chlorite such as sodium chlorite or calcium chlorite, gaseous chlorine in admixture with an inert gas, usually air, is brought into contact with the solid chlorite. The chlorine gas and the solid chlorite react with the formation of the desired chlorine dioxide and also sodium chloride, and the resulting chlorine dioxide is removed from the reaction zone in admixture with the diluent air.

Chlorine dioxide, as is well known, is a relatively unstable and explosive substance. In the generation and handling of chlorine dioxide, therefore, care must be taken to eliminate as far as possible those conditions leading to its explosion. This difficulty is usually avoided by generating and utilizing chlorine dioxide in a high state of dilution with an inert gaseous medium such as air, and for this purpose both chlorine and air are introduced into the chlorine dioxide-generating zone.

Admixtures of chlorine dioxide and air in which the concentration of chlorine dioxide is below an amount such that the partial pressure thereof is about 70 mm. of Hg can be safely handled. If the concentration of chlorine dioxide is permitted to exceed this limit, an explosion is likely to occur.

In the generation of chlorine dioxide from a solid chlorite, if the concentration of chlorine dioxide reaches an unsafe amount and an explosion does take place, the resulting heat of reaction is so great that the chlorite is rapidly converted to chlorate at a temperature which is likely to be above the melting point of the chlorate. Since chlorates are active oxidizing agents, it is important to confine the hot or molten chlorate formed by the explosion in order to prevent its setting fire to organic material with which it might come in contact.

My improved continuous gas generator substantially eliminates the hazard arising from a chlorine dioxide explosion. This improved apparatus comprises essentially a reaction chamber through which a solid chlorite and an air-chlorine mixture are continuously passed advantageously countercurrently, an explosion chamber abutting and communicating with the reaction chamber, and a gas-impervious, rupturable disc normally preventing communication between the two chambers. The gas-impervious disc, which is preferably thin and may be formed from a metal or plastic, is sufficiently strong to withstand the normal operating pressures within the reaction chamber. In the event of an explosion in the reaction chamber, however, in which case the pressure within this chamber suddenly exceeds the predetermined maximum safe operating pressure therein, the thin disc is ruptured, and the contents of the reaction chamber are discharged into the explosion chamber, wherein they are confined and prevented from causing damage.

Advantageously, the reaction chamber is inclined to the horizontal, and the communication between the reaction chamber and the explosion chamber is located near the lower end of the former. The cross-sectional area of this communication is preferably substantially the same as that of the reaction chamber so that, upon rupture of the disc, back pressure within the reaction chamber is minimized. The explosion chamber is with advantage provided with a vent, which is also of relatively large cross-sectional area, for the discharge of gases therefrom to the external atmosphere. Suitable provision is made for the continuous, countercurrent introduction of the solid chlorite and the air-chlorine mixture to and the continuous withdrawal of the chlorine dioxide-air mixture and the spent chlorite from opposite ends of the reaction chamber, respectively, and for the removal of solids from the explosion chamber. As will be apparent, the countercurrent flow of the reactants offers certain operating advantages.

My improved apparatus will now be described in connection with the accompanying drawing, which represents an elevation, partly in cross-section, of one embodiment of my invention, such apparatus being particularly adapted to the generation of chlorine dioxide by the reaction between chlorine and a chlorite.

The gas-generating apparatus of my invention includes the reactor or reaction chamber 10, which is advantageously cylindrically shaped and inclined to the horizontal as shown. At its upper end this reactor is provided with the charging hopper 12, which may comprise a standard bell-and-hopper arrangement (details not shown) so that the solid chlorite can be charged to the reactor during operation thereof without any gas leakage at this point.

The chlorite is continuously moved through the reactor 10 by any suitable means such as the screw conveyor 14, which may be driven by any suitable power source (not shown) through the gear train 16. This screw conveyor is operated at such a speed that not only is the chlorite continuously passed through the reactor but the reactor is maintained substantially full of chlorite so that the chlorine-air mixture is brought into contact with the moving mass of chlorite throughout its entire cross-sectional area and is prevented from forming channels and by-passing the mass of chlorite.

The screw conveyor continuously or intermittently, if the operating conditions so require, discharges the spent chlorite (as chloride) from the lower end of the reactor into the sealing chamber 18, which contains a body of water 20 to seal this end of the reactor against gas leakage during removal of the spent chlorite therefrom. Water may be introduced into this sealing chamber through the valved inlet 22, and the resulting chloride solution may be removed therefrom through the valved outlet 24.

The chlorine gas suitably diluted with air is introduced into the reactor through the valved line 26 and is passed through the reactor countercurrently to the chlorite. The rates at which the chlorite and the chlorine are passed through the reactor are respectively so controlled that the chlorite has been substantially reacted by the time it reaches the lower end of the reactor and substantially no chlorine is present in the upper end of the reactor. The proportion of air admixed with the incoming chlorine is so adjusted that the concentration of chlorine dioxide in the resulting chlorine dioxide-air effluent does not exceed the maximum safe limit. This chlorine dioxide-air effluent is removed from the reactor through valved line 28.

In accordance with my invention, there is positioned immediately adjacent to and abutting the reactor 10 an explosion chamber 30, which, as indicated in the drawing, may advantageously be located directly below the reactor and may comprise all or part of the support therefor. Communication between this explosion chamber and the reaction chamber is provided by the opening 32, which is normally closed by the gas-impervious rupturable disc 34.

This disc may be fixed in position by means of the holding ring 36, which may be bolted to the annular flange 38 surrounding the opening 32 in the wall of the reactor. A screen or other perforated support 40 is provided to keep the chlorite in the reactor out of direct contact with the disc 34. This disc may also be formed as a part of the wall of the reactor if it is so desired.

Disc 34 is advantageously formed of relatively thin material such as a metal, e. g., silver. It is made sufficiently strong to withstand normal operating pressures within the reactor up to a predetermined maximum safe pressure. In the event that the pressure within the reactor exceeds this predetermined maximum, as will happen if the concentration of chlorine dioxide exceeds the maximum safe amount and an explosion occurs, the disc is so designed that it will rupture and permit the contents of the reactor to be discharged into the explosion chamber, where any chlorate formed as the result of the explosion will be confined and prevented from causing damage. Screen 40 is, of course, so designed that the contents of the reactor can readily pass therethrough into the explosion chamber.

The floor 42 of the explosion chamber is desirably sloped as shown so that the solids discharged thereinto can be removed by flushing with water, which may be introduced into this chamber for this purpose through the valved inlet 44. Outlet 46 is provided for the removal of the resulting aqueous mixture from this chamber.

Since, in the event of an explosion, at least a portion of the gases within the reactor will be forced into the explosion chamber along with the chlorite and any chlorate formed therefrom, this chamber is provided with the vent 48 for the passage of such gases to the external atmosphere. The cross-sectional area of this vent as well as that of opening 32 should be sufficiently large to minimize the build-up of back pressure within the reactor and explosion chamber and may be substantially the same as the cross-sectional area of the reactor.

Because of the corrosive nature of the several reactants, the reactor 10 is advantageously made corrosion-resistant and may comprise a cylinder of stainless steel or other corrosion-resisting metal or a cylinder of ordinary steel lined with stoneware or glass. The screw conveyor 14 is also fashioned from stainless steel or "Monel" metal, for example. The remaining parts of the apparatus such as the explosion chamber may be satisfactorily constructed of ordinary steel.

The reactor of a typical gas generator built in accordance with my invention is about 5 feet long and 6 inches in diameter, is slightly inclined as shown, and is provided near its lower end with a 5-inch rupturable disc. In a typical operation, sodium chlorite is passed through such a reactor at the rate of 1 pound in 10 hours and is completely converted to chlorine dioxide and sodium chloride by reaction with gaseous chlorine. Although the screw conveyor 14 may be operated continuously, it is advantageously operated intermittently in such an operation. The application of the present invention is not, of course, limited to the apparatus described in this example.

Means (not shown) may be provided to operate the charging hopper 12 in coordination with the operation of the screw conveyor 14. The explosion chamber 30 is at least the same size as the reactor and advantageously considerably larger so that a substantial margin of safety is provided.

This continuous reactor may also be vertically disposed, if desired, in which case appropriate changes must be made in the respective charging, discharging, and sealing mechanisms. Also, more than one rupturable disc may be provided for a reactor.

Various modifications may be made in the above-described apparatus without departing from the present invention as defined in the claims.

I claim:

1. A gas generator adapted to continuous operation for effecting a reaction between a solid reactant and a gaseous reactant to generate a gas, comprising an elongated enclosed reaction chamber, inlet means sealed against escape of gas and located at one end of the reaction chamber for introduction of the solid reactant, an outlet for the generated gas located at said end of the reaction chamber, an inlet for the gaseous reactant and an outlet for the exhausted solid reactant at the other end of the reaction chamber, a conveyor within the reaction chamber adapted to move the solid from the inlet to the outlet thereof, an enclosed, vented chamber adjacent to and abutting the reaction chamber and connected therewith through an opening normally closed by a rupturable gas-impervious disc, said disc being sufficiently strong to withstand a predetermined operating pressure within said reaction chamber and rupturing when said predetermined pressure is exceeded.

2. A gas generator adapted to continuous operation for effecting a reaction between a solid reactant and a gaseous reactant to generate a gas, comprising an elongated enclosed reaction chamber inclined to the horizontal, inlet means sealed against escape of gas and located at the upper end of the reaction chamber for introduction of the solid reactant, an outlet for the generated gas located at the upper end of the reaction chamber, an inlet for the gaseous reactant and an outlet for the exhausted solid reactant at the lower end of the reaction chamber, a conveyor within the reaction chamber adapted to move the solid from the inlet to the outlet thereof, an enclosed, vented chamber immediately below the reaction chamber and connected therewith through an opening normally closed by a rupturable gas-impervious disc, said disc being sufficiently strong to withstand a predetermined operating pressure within said reaction chamber and rupturing when said predetermined pressure is exceeded.

3. A gas generator adapted to continuous operation for effecting a reaction between a solid reactant and a gaseous reactant to generate a gas, comprising an elongated enclosed reaction chamber inclined to the horizontal, inlet means sealed against escape of gas and located at the upper end of the reaction chamber for introduction of the solid reactant, an outlet for the generated gas located at the upper end of the reaction chamber, an inlet for the gaseous reactant and an outlet for the exhausted solid reactant at the lower end of the reaction chamber, a conveyor within the reaction chamber adapted to move the solid from the inlet to the outlet thereof, an enclosed, vented chamber immediately below the reaction chamber and connected therewith through an opening normally closed by a rupturable gas-impervious disc, said disc being sufficiently strong to withstand a predetermined operating pressure within said reaction chamber and rupturing when said predetermined pressure is exceeded, and a perforated support for the solid reactant positioned in said opening above the rupturable disc.

ERIC RAYMOND WOODWARD.

REFERENCES CITED

The following references are of record in the file of this patent:

UNITED STATES PATENTS

| Number | Name | Date |
|---|---|---|
| 2,353,093 | Tryon | July 4, 1944 |
| 2,407,832 | Hutchinson | Sept. 17, 1946 |

FOREIGN PATENTS

| Number | Country | Date |
|---|---|---|
| 159,869 | Great Britain | Jan. 25, 1921 |
| 305,566 | Germany | Aug. 25, 1919 |